United States Patent Office 3,177,206
Patented Apr. 6, 1965

3,177,206
SELECTIVE BROMINATION OF A-RING AROMATIC 17-KETALIZED STEROIDS
Leland L. Smith, Malvern, Pa., and Daniel M. Teller, Wilmington, Del., assignors to American Home Products Corporation, New York, N.Y., a corporation of Delaware
No Drawing. Filed Mar. 7, 1963, Ser. No. 263,406
1 Claim. (Cl. 260—239.55)

The present invention is directed to a new and novel method for brominating steroids. More specifically, the invention involves bromination of steroids of the 1,3,5-estratriene and A-ring aromatic 13-alkylated gonane series. Still more particularly, the invention relates to a unique manner for selective 16-bromination of A-ring aromatic steroids having a ketal function in position 17 of the steroid nucleus.

It has long been recognized that the pharmacological activity of steroidal compounds in general is affected by the substitution of a halogen atom in the 16-position of such compounds. The effect has been found generally to be an increase in the particular activity of the steroid so substituted. However, for the specific steroids of the present invention, due to the partially unsaturated nature of the A-ring the general reaction tendency using the conventional bromination techniques of the prior art has been to promote bromination at one or more positions in the aromatic A-ring rather than in the D-ring, particularly at position 16.

It is a primary object of the present invention to disclose a process for specific 16-bromination of those steroidal compounds as illustrated below which normally resist such substitution because of the normally preferred points of attraction for bromine atoms in other portions of their nuclei, particularly the aromatic A-ring moiety of the compound sought to be brominated.

As a general example of those series of compounds which it is desired to brominate at position 16 by means of our novel process there may be mentioned the natural or synthetic steroids having the following general structure:

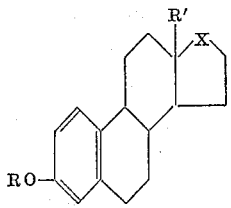

wherein R represents a substituent such as hydrogen, lower alkyl, lower aralkyl, lower cycloalkyl, lower alkenyl, and acyl radicals having up to about 8 carbon atoms. R' represents a lower alkyl group, preferably methyl or ethyl, and X stands for a member such as alkylenedioxymethylene, alkylenethioxymethylene and alkylenedithiomethylene.

As to those starting materials wherein R' is a lower alkyl higher than methyl, these are disclosed in Smith et al. Belgian Patent Number 608,369. Where R' is methyl on the other hand these starting materials are disclosed in Smith copending application Serial Number 219,135, now U.S. Pat. No. 3,138,588. In the case where R' is methyl the compound 16α-bromo-17,17-ethylenedioxy-3-methoxyestra-1,3,5(10)-triene is known as prepared by the much more tedious and complex multistep method reported by Johnson and Johns, J. Am. Chem. Soc., 79, 2005 (1957). It is a feature of our novel process that we may obtain such products by our simple direct procedure with a saving in time and effort.

The 16-brominated steroids obtained by means of our novel process improvement are valuable cholesterol lowering agents with low feminizing side effects when tested in mammals, which of course renders their efficient and easy manufacture a valuable contribution to the steroid art.

Our novel and improved process in general involves treatment of a starting material as above disclosed with a class of selected brominating agents under a selected combination of process conditions to obtain the 16-brominated steroidal analogs of the aforesaid starting materials. As selective brominating agents we employ a class of aromatic nitrogenous hetercyclic bases as their hydrobromide perbromide derivatives, i.e., pyridinium hydrobromide perbromide, quinolinium hydrobromide perbromide; quaternary ammonium bases as their bromide perbromide derivatives such as the aryltrialkylammonium bromides like phenyltrimethylammonium bromide perbromide; tetraalkylammonium bromide perbromides such as tetramethylammonium bromide perbromide and the like, as well as various combinations of quaternary aryl and/or alkyl ammonium bromide perbromides such as diaryldialkyl ammonium bromide perbromide, triarylalkylammonium bromide perbromide and the like equivalents.

As regards reaction conditions for our selective bromination we must use a solvent which will not react with our brominating agent and which dissolves the steroid reactant. The preferred solvents which meet both of these requirements are tetrahydrofuran, tetrahydropyran, and the like, which are good solvents for the reaction because of the high degree of solubility of the brominating agents therein. The reaction however can be carried out in other organic solvents as for instance lower aliphatic alcohols such as ethanol, lower monocarboxylic acids such as acetic acid, where the brominating agent is but partially soluble. The reaction under these conditions is of course a two-phase heterogenous system, but the brominated product can be recovered.

The course of the reaction may be followed by the extent of precipitation of the regenerated quaternary ammonium salt after it has brominated the steroid. The regenerated ammonium salt is less soluble in the solvent system and precipitates out during the reaction. In general, the time of the reaction is controlled by this means, subject to variation by elevated or depressed temperature of reaction employed. In general, reaction times of from about 1 to 5 hours are optimum for maximum yield when operating at room temperature. However, periods of up to 24 hours can be used, and shorter reaction times can be employed where the reaction mixture is heated.

As regards reaction temperature for our bromination, in general the reaction will operate successfully at temperature ranging from 0° C. up to the boiling or reflux point of the organic solvent employed, although room temperature is preferred for most reactions where a maximum yield under optimum control is desired. The brominating agent employed in the reaction should be present in at least equivalent amounts with the steroidal starting material. For convenience, moderate excesses of the brominating agent may be employed without the formation of harmful byproducts.

As a specific embodiment of the process of our invention we may consider the treatment of either a naturally occurring steroid such as 17,17-ethylenedioxy-3-methoxy-1,3,5(10)-estratriene (as in Reaction A below) or a synthetic steroid, typically 13β-ethyl-17,17-ethylenedioxy-3-methoxygona-1,3,5,(10)-triene (as in Reaction B below) with the reagent pyridinium hydrobromide perbromide at room temperature using anhydrous tetrahydrofuran as a solvent for about 2 to 2½ hours to effect the desired 16-bromination and to obtain the 16-brominated analogs thereof.

These reactions may be illustrated, to wit:

A)

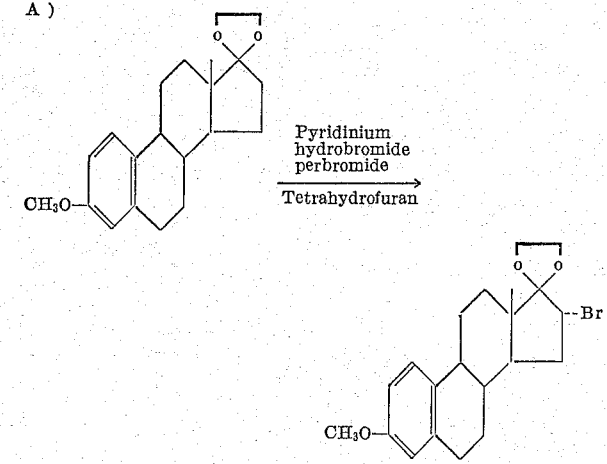

(B)

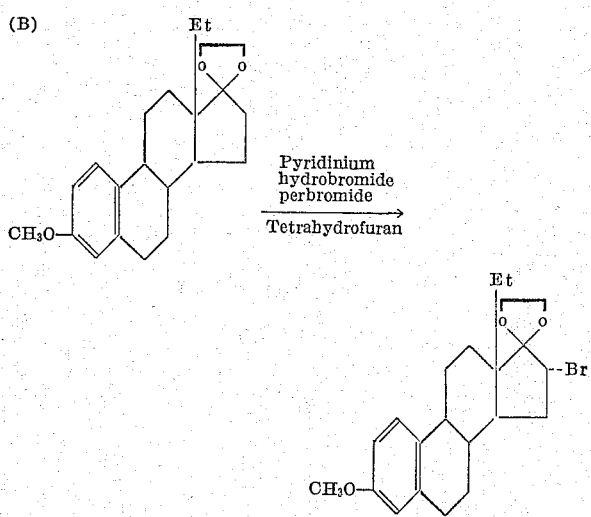

The following examples more particularly point out the details of our process and serve further to illustrate our invention. It is of course to be understood that the said examples are purely for illustration of the invention and do not limit its scope of the concept involved. For a proper legal definition of our method, attention is directed to the several appended claims.

EXAMPLE 1

*16α-bromo-17,17-ethylenedioxy-3-methoxyestra-1,3,5(10)-triene*

To 0.10 g. of 17,17-ethylenedioxy-3-methoxyestra-1,3,5(10)-triene dissolved in 10 ml. of anhydrous tetrahydrofuran, add 0.134 g. of pyridinium hydrobromide perbromide all in one portion at room temperature with stirring. After stirring for 2½ hours at room temperature, pour the reaction mixture into 25 ml. of 5% aqueous sodium bicarbonate, extract with chloroform, wash the chloroform extracts with water and dry over anhydrous magnesium sulfate. Remove the solvents under vacuum to obtain a colorless solid. Recrystallize from methanol to obtain the product as colorless needles; 0.091 g., M.P. 180–188°.

EXAMPLE 2

*dl-16α-bromo-13β-ethyl-17,17-ethylenedioxy-3-methoxygona-1,3,5(10)-triene*

To 0.650 g. of *dl*-13β-ethyl-17,17,ethylenedioxy-3-methoxygona-1,3,5(10)-triene dissolved in 65 ml. of anhydrous tetrahydrofuran, add 0.840 g. of pyridinium hydrobromide perbromide all in one portion at room temperature with stirring. After stirring for 2½ hours at room temperature, pour the reaction mixture into 150 ml. of 5% aqueous sodium bicarbonate, extract with chloroform, wash the chloroform extracts with water, and dry over anhydrous magnesium sulfate. Remove the solvents under vacuum to obtain a colorless solid. Recrystallize twice from methanol to obtain the product as colorless needles; 0.31 g., M.P. 141–148°; $\lambda_{max}$ 288 m$\mu$ ($\epsilon$2040).

*Analysis.*—Calcd. for $C_{22}H_{29}O_3Br$: C, 62.71; H, 6.94; Br, 18.97. Found: C, 62.08; H, 7.04; Br, 19.52.

EXAMPLE 3

*3-allyloxy-16α-bromo-17,17-ethylenedioxyestra-1,3,5(10)-triene*

To 0.10 g. of 3-allyloxy-17,17-ethylenedioxyestra-1,3,5(10)-triene dissolved in 10 ml. of anhydrous tetrahydrofuran, add 0.120 g. of pyridinium hydrobromide perbromide all in one portion at room temperature with stirring. Ater stirring for one hour at room temperature pour the reaction mixture into 25 ml. of aqueous sodium bicarbonate, extract with chloroform, wash the chloroform extracts with water, and dry over anhydrous magnesium sulfate. Remove the solvents under vacuum to obtain the colorless product, which may be purified futher by recrystallization from alcohol.

EXAMPLE 4

*16α-bromo-17,17-ethylenedithio-3-methoxyestra-1,3,5(10)-triene*

To 0.10 g. of 17,17-ethylenedithio-3-methoxyestra-1,3,5(10)-triene dissolved in 10 ml. of anhydrous tetrahydrofuran, add 0.1 g. of pyridinium hydrobromide perbromide all in one portion at room temperature with stirring. After stirring for 2 hours at room temperature pour the reaction mixture into 25 ml. of aqueous sodium bicarbonate, extract with chloroform, wash the chloroform extracts with water, and dry over anhydrous magnesium sulfate. Remove the solvents under vacuum to obtain the colorless product.

EXAMPLE 5

*16α-bromo-17,17-ethylenedioxy-3-methoxyestra-1,3,5-(10)-triene*

Dissolve 1.0 g. of 17,17-ethylenedioxy-3-methoxyestra-1,3,5(10)-triene in 100 ml. of anhydrous tetrahydrofuran, and add one equivalent of quinolinium hydrobromide perbromide in one portion. Stir the mixture at room temperature; discontinue stirring from time to time to observe the completeness of precipitation of the quinolinium salt. When precipitation of the regenerated quinolinium salt is complete (after about three hours), terminate the reaction. Work up the reaction mixture in the manner described in Example 1 to obtain the pure product.

EXAMPLE 6

*16α-bromo-17,17-ethylenedioxy-3-methoxyestra-1,3,5(10)-triene*

Dissolve 500 mg. of 17,17-ethylene-3-methoxyestra-1,3,5(10)-triene in 60 ml. of anhydrous tetrahydropyran and add one equivalent of phenyltrimethylammonium hydrobromide perbromide. Stir the mixture thoroughly for 90 minutes, and then isolate the product in the manner described in Example 1.

We claim:

A method for selective 16-alpha bromination of 1,3,5(10) estratriene compounds of the formula

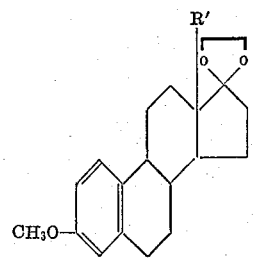

wherein R' represents a lower alkyl, which comprises brominating an estratriene of said formula with pyridinium hydrobromide perbromide in an organic solvent solution where said estratriene is at least partially soluble, at about room temperature, and isolating from the reaction mixture the corresponding 16-α-bromo-1,3,5(10) estratriene compound.

References Cited by the Examiner

Marquet et al.: Bull. Soc. Chim., France, pp. 1822–31 (1961).

LEWIS GOTTS, *Primary Examiner.*